Patented July 23, 1946

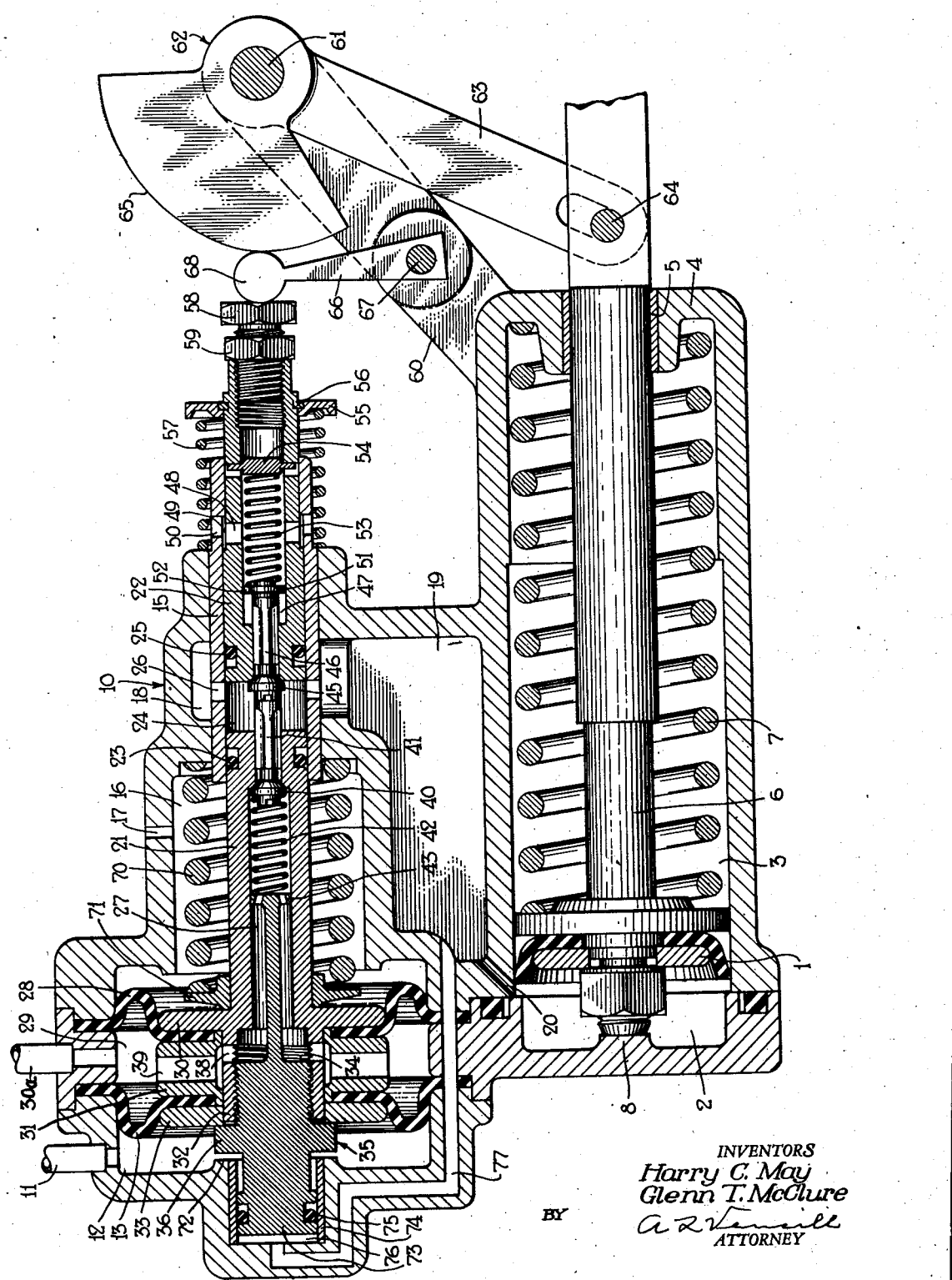

2,404,512

UNITED STATES PATENT OFFICE 2,404,512

CONTROL APPARATUS

Harry C. May, East McKeesport, and Glenn T. McClure, McKeesport, Pa., assignors to The Westinghouse Air Brake Company, Wilmerding, Pa., a corporation of Pennsylvania Application April 29, 1944, Serial No. 533,427

6 Claims. (Cl. 121—41)

This invention relates to control apparatus and more particularly to the type embodying fluid operated power means for selectively positioning a multi-position device to be operated, such as an engine throttle, a clutch, etc.

One object of the invention is the provision of an improved control apparatus of the above type.

Another object of the invention is the provision of a control apparatus embodying a fluid pressure controlled supply and release valve mechanism so constructed and arranged that the pressure of fluid provided by said mechanism has no effect upon the operation of the apparatus in response to the controlling fluid.

Still another object of the invention is the provision of a relatively simple control apparatus arranged for control pneumatically from any suitable control station and which is adapted to operate with promptness to position a device being controlled in accordance with the pressure of a controlling fluid, and regardless of the pressure of fluid required to position said device.

Other objects and advantages will be apparent from the following more detailed description of the invention.

In the accompanying drawing, the single figure is a diagrammatic sectional view of a control apparatus embodying the invention.

Description

As shown in the drawing, the improved control apparatus comprises a casing containing a power piston 1 having at one side a pressure chamber 2 and having at the opposite side a non-pressure chamber 3. The outer end of the non-pressure chamber is closed by an integrally formed head 4 having a central opening lined with a bushing 5. A piston rod 6 having one end secured to the center of piston 1 extends through the non-pressure chamber 3 and bushing 5 to the exterior of the casing. Outside of the casing the rod 6 is adapted to be connected to a device (not shown) which it is desired to operate. Sufficient clearance may exist around the rod 6 in bushing 5 to allow breathing of the non-pressure chamber 3 to and from atmosphere.

The non-pressure chamber 3 contains a coil control spring 7 encircling the piston rod 6 with one end supported on the non-pressure head 4, while the opposite end bears against piston 1. This spring is under a sufficient degree of pressure to urge the piston 1 to the position in which it is shown in the drawing, which position is determined by contact of piston rod 6 with a stop 8 in pressure chamber 2, when the pressure in said chamber is substantially atmospheric pressure.

A supply and release valve structure 10 is provided for regulating pressure of fluid in pressure chamber 2 to control the positioning of the power piston 1 in accordance with pressure of controlling fluid provided through a control pipe 11 to act in a chamber 12 on a pilot diaphragm 13. The control pipe 11 may be connected to any suitable operator's control device (not shown) located at any desired station and which is operative to provide any selected pressure of fluid in chamber 12 from atmospheric pressure to a chosen maximum degree in excess of that of the atmosphere.

The supply and release valve structure 10 comprises a bushing or sleeve 15 pressed into a bore in the casing in parallel relation to but spaced from the piston rod 6. One end of this bushing terminates in a chamber 16 which may be open to atmosphere through a breather port 17. The opposite end extends outside of the casing in the same direction as piston rod 6, while within the casing, the bushing is encircled by an annular recess 18 which opens to a cavity 19. Pressure chamber 2 is also open to cavity 19 through a passage 20.

A plunger 21 contained mainly in chamber 16 has one end mounted to slide in the adjacent end portion of sleeve 15, while an oppositely arranged plunger 22 also slidably mounted in said bushing projects from the opposite end of bushing 15. Within the sleeve 15 the plunger 21 has an annular recess containing a seal ring 23 having sealing contact with said plunger and the inner wall of said sleeve to prevent leakage of fluid under pressure from a chamber 24 formed between the adjacent ends of the two plungers to chamber 16. A similar seal ring 25 is provided in the adjacent end of plunger 22 to prevent leakage of fluid under pressure from chamber 24 past said plunger to atmosphere. Chamber 24 is constantly open through one or more ports 26 in bushing 15 to recess 18 and thus to pressure chamber 2.

The plunger 21 has a bore or chamber 27 arranged to be constantly supplied with fluid under pressure from any suitable source. One structure for thus conveying fluid to bore 27 consists, as shown in the drawing, of a flexible diaphragm 28 of the same area as diaphragm 13 arranged in coaxial but reversed relation to and spaced from the diaphragm 13, both diaphragms being clamped to the casing around their outer peripheral edges in a conventional manner. Between the two diaphragms is formed a pressure chamber 29 to which is connected a fluid pressure supply pipe 30a leading from the source of fluid under pressure. Diaphragm 28 has at its opposite side the chamber 16.

The plunger 21 has a follower plate 30 in chamber 16 engaging the adjacent face of diaphragm 28, and extending from this follower plate through the two diaphragms and a follower plate 31 engaging and connecting the adjacent faces of the two diaphragms is a projection 32 of plunger 21. This projection extends into chamber 12 slightly beyond the outer face of diaphragm 13, and within this chamber a follower plate 33 is mounted on this projection which plate engages the adjacent face of diaphragm 13. The projection 32 is provided with a screw-threaded bore 34, and a nut 35 having screw-threaded engagement within this bore is provided with a flange 36 which engages the plate 33. Tightening of nut 35 clamps the central portion of diaphragm 13 between the follower plates 33 and 31 and at the same time clamps the central portion of diaphragm 28 between plates 31 and 30, as will be apparent.

It will be seen that the effect of pressure of fluid from the source in chamber 29 on diaphragm 13 will be offset by its effect on diaphragm 28 and will therefore not influence in any way pressure of controlling fluid in chamber 12.

The screw-threaded bore 34 in the projection 32 of plunger 21 is open to bore 27 and also through one or more ports 38 in said projection and ports 39 in follower plate 31 to chamber 29, whereby bore 27 will be constantly supplied with fluid under pressure from the supply pipe 30a when said pipe is supplied with fluid under pressure.

The bore 27 contains a fluid pressure supply valve 40 having a fluted stem 41 having sliding contact with the side wall of a bore which is of smaller diameter than that of bore 27 and which, at the end of plunger 21, opens into chamber 24. At the junction of these two bores is a seat for the supply valve 40. One end of a coil spring 42 contained in chamber 27 bears against the supply valve 40 while the opposite end is supported on a perforated seat 43 projecting into said bore from the nut 35. This spring is under pressure and therefore constantly effective to urge the supply valve toward its seat.

In chamber 24, the end of the supply valve stem 41 engages a fluid pressure release valve 45 contained in said chamber and having a fluted stem 46 which is disposed to slide in an axial bore provided in the plunger 22, said stem 46 extending through said bore and into a bore 47 of larger diameter. The plunger 22 is provided on its end in chamber 24 with a seat for cooperation with the release valve to control communication between said chamber and bore 47 which bore is in constant communication with the atmosphere through one or more ports 48, an annular recess 49 in the outer peripheral surface of plunger 21 and one or more ports 50 in sleeve 15.

In bore 47 the release valve stem 46 engages one side of a spring seat 51 which is loosely mounted in said bore and which may be provided with one or more notches 52 around its peripherial edge to allow flow of fluid under pressure from one side to the opposite side. The opposite side of spring seat 51 is engaged by one end of a coil spring 53, the opposite end of which is supported by a follower 54 secured in plunger 22. The spring 53 is confined under pressure between follower 54 and the release valve stem 46 so as to be constantly effective to urge the plunger 22 in a direction out of seating contact with the release valve 45. The spring 53 is weaker than spring 42 for reasons which will be later brought out.

A spring seat 55 is secured to plunger 22 outside of the casing by any suitable securing means 56 and is engaged by one end of a coil spring 57 encircling the portion of sleeve 15 projecting from the casing, and the opposite end of said spring is supported on the portion of the casing encircling said sleeve. The spring 57 exerts a relatively small degree of force on plunger 22 urging same in a direction toward the right hand. An adjusting screw 58 is mounted in the outermost end of plunger 22 and is secured in an adjusted position by a lock nut 59.

The casing is provided with a projecting bracket 60 in the outer end of which is a fulcrum pin 61. A follower-up member 62 mounted to rock on this pin has an operating arm 63 in the end of which is a slot through which extends a pin 64 secured to the power piston rod 6, whereby said arm will be moved with said piston. The follow-up member 62 also comprises a cam 65, the peripherial surface of which is aligned with the axis of the adjusting screw 58. An arm 66 fulcrumed at one end on a pin 67 secured in bracket 60 has at its opposite end a cylindrical like enlargement 68 interposed between and engaging on one side the adjusting screw 58 while its opposite side engages the peripherial surface of cam 65. The surface of cam 65 is so formed as to permit movement of plunger 22 in the direction of said cam upon rocking of the follower-up member 62 in a counterclockwise direction, and to displace said plunger into sleeve 15 upon rocking of the follow-up member in the opposite direction.

In chamber 16 is a control spring 70 encircling the plunger 21. One end of this spring is supported on the portion of the casing encircling the end of bushing 15 which extends into said chamber, while the opposite end of said spring bears against a follower 71 slidably mounted on said plunger and arranged to contact the follower plate 30.

The spring 70 is arranged to urge the diaphragms 13, 28 and plunger 21 in the direction of the left hand only to the positions shown in the drawing and to oppose with increasing force movement of these parts from said positions in the direction of the right hand. The diaphragms 13, 28, and plunger 21 are also movable from the positions shown in the drawing toward the left hand relative to the control spring 70 and plunger 22 to positions defined by contact of nut 35 with a stop shoulder 72. The action of spring 53 on the release valve stem 46 transmitted through the two valves 45 and 40 and the stronger spring 42 to nut 35 is adapted to effect movement of the parts to this latter position defined by contact between nut 35 and stop 72, and it will be noted that such movement will unseat the release valve 45 from the end of plunger 22 while the supply valve 40 will remain seated under pressure of the stronger spring 42.

The nut 35 has an extension the end of which constitutes a plunger 73 which is disposed to slide in a bushing 74 in the casing. The plunger 73 has an annular recess in which is disposed a seal ring 75 having sealing contact with the plunger and bushing to prevent leakage of fluid under pressure between chamber 12 and a pressure chamber 76 provided at the outer end of the plunger. Chamber 76 is open through a passage 77 to cavity 19 and thus to chamber 24 at the opposite end of plunger 21. The areas of the two plungers 21 and 73 presented to chambers 24 and 16, respectively, are preferably the same.

Operation

In operation, let it be initially assumed that the control pipe 11 is open to atmosphere, under which condition the control spring 70 will be expanded as shown in the drawing, and the diaphragms 13, 28, plunger 21 and the release valve 45 will be urged by spring 53 to the position defined by contact of nut 35 with stop 72. With these parts positioned as just described and with plunger 22 maintained in contact with cam 65 by bias spring 57, said plunger will be unseated from the release valve 45, thereby opening to atmosphere chambers 24, 16 and the power piston chamber 2. With chamber 2 open to atmosphere the power piston 1 and the follow-up member 62 will occupy what may be called their normal positions, shown in the drawing, under the action of spring 7.

Let it further be assumed that pipe 30a is connected with a suitable source of fluid under pressure. Fluid under pressure will therefore be supplied from the source to bore 27 in plunger 21 but cannot escape therefrom at this time due to the supply valve 40 being seated.

If the operator now desires to cause movement of the power piston 1 and piston rod 6 out of their normal positions to actuate a device (not shown) to which said rod may be connected, he will supply fluid under pressure through pipe 11 to pressure chamber 12 to act on diaphragm 13. When the pressure of fluid in chamber 13 is thus increased sufficiently, the diaphragms 13 and 28 will deflect toward the right hand against pressure of spring 53 and move the plunger 21 in the same direction to the position shown in the drawing in which spring 70 becomes effective to oppose further movement. During this movement however, spring 42 will hold the supply valve 40 seated and move the release valve 45 relative to and into seating engagement with the end of plunger 22, it being noted that spring 70 is not effective during this movement to seat the release valve 45.

When the pressure of fluid in chamber 12 is then further increased sufficiently to overcome the opposing force of control spring 70, diaphragms 12 and 28 will deflect against the opposing pressure of said spring and move plunger 21 to a position in which the pressure of said spring is increased to a degree sufficient to balance the pressure of fluid in chamber 12 on diaphragm 13. This movement of plunger 21 will be relative to plunger 22 since the latter is held against movement at this time by the action of spring 7 on piston 1 which holds the follow-up member 62 stationary. As a result, this movement of plunger 21 in the direction of plunger 22, with the release valve 45 seated as above described, will be relative to the supply valve 40, thus opening said supply valve. Upon opening of the supply valve 40, fluid under pressure supplied from pipe 30a to bore 27 in plunger 21 will flow past said valve to chamber 24 and thence through passage 20 to chamber 2 to act on piston 1. When the pressure in chamber 2, acting on one side of piston 1, is thus increased sufficiently to overcome the opposing force of spring 7 and of the device being operated, the piston 1 will move against the opposing pressure of said spring to adjust said device.

This movement of piston 1 will turn or rock the follow-up member 62 in a counterclockwise direction so that cam 65 will permit pressure of fluid in chamber 24 plus the light bias force of spring 57 on plunger 22 to move said plunger in a direction away from the plunger 21. With plunger 21 in a stationary condition by equalizing the opposing pressures of fluid in chamber 12 and of spring 70, this movement of plunger 22 away from plunger 21 will permit spring 42 to move the supply valve 40 with plunger 22 in the direction of its seat. The supply valve 40 will thus be moved toward its seat as the power piston moves outwardly under pressure of fluid provided in chamber 2, and said valve will finally contact its seat to prevent further supply of fluid to chamber 2, when the power piston 1 obtains a position corresponding to or predetermined by the position of diaphragm 13 and plunger 21 and the pressure of fluid provided in chamber 12.

If the piston 1 is moved from normal position less than its full stroke and the operator desires to increase the movement of said piston against the opposing pressure of spring 7, he will increase the pressure of fluid in chamber 12 to a chosen higher degree. The diaphragm 13 will then deflect to a new position corresponding to the increased pressure of fluid in chamber 12 and again open the supply valve 40. Fluid under pressure will again be supplied to chamber 2 to increase the pressure of fluid effective on piston 1. Piston 1 will then move further against the opposing pressure of spring 7, and the cam 65 will operate to permit movement of plunger 22 away from plunger 21 to a position in which the supply valve 40 will again seat to cut off further flow of fluid under pressure to chamber 2, whereupon movement of piston 1 will again cease in a position corresponding to that of plunger 21 and thus to the pressure of fluid provided in chamber 12.

From the above description it will be seen that the power piston 1 can be caused to move out of its normal position against the opposing pressure of spring 7 and to stop in any selected position by the provision of the proper pressure of fluid in diaphragm chamber 12. Further, increasing the pressure of fluid in chamber 12 in successive steps of any desired number or degree will cause corresponding steps of adjustment of piston 1 out of its normal position.

On the other hand, assuming that the piston 1 is out of its normal position and the operator desires that it return toward normal position, he will reduce the pressure of fluid in chamber 12 whereupon diaphragms 13 and 28 will be deflected by spring 70 to a position where, in case less than a complete release of fluid under pressure from chamber 12 is effected, the reduced pressure of fluid in chamber 12 will balance the reduced force of spring 70. The diaphragms and plunger 21 will then cease moving. This movement of plunger 21 will be relative to plunger 22 which will at this time be held stationary by pressure of fluid in chamber 24 and by pressure of spring 57, since the power piston 1 and follow-up member 62 are stationary, so that under the action of spring 53, the release valve 45 will move with plunger 21 and out of seating contact with plunger 22. When the release valve 45 is thus opened, fluid under pressure will be released from chamber 24 and the power piston chamber 2, and as the pressure in chamber 2 is reduced the power piston 1 will be moved by spring 7 back in the direction of its normal position.

As the power piston 2 is thus returned toward its normal position, it will actuate the cam 65 to move plunger 22 in the direction of the release valve 45 which at this time will be held stationary with plunger 21. This plunger 22 will thus continue to move until it contacts the release valve 45 whereupon further release of fluid under pressure from the power piston chamber 2 will be prevented and said piston will stop in a position, it will be noted, corresponding to that of plunger 21 and in turn to the reduced pressure of fluid in chamber 12.

Upon a further reduction in pressure in chamber 12 the plunger 21 will assume a new position corresponding to such pressure, and the opening and then closing of the release valve 45 will cause the power piston 1 to move to a new and corresponding position.

Upon a complete release of fluid under pressure from chamber 12, the spring 70 will return the diaphragms and plunger 21 to the positions shown in the drawing and the action of spring 53 on the release valve stem 46 will then continue movement of said diaphragms and of plunger 21 to the position defined by contact between the nut 35 and stop 72. A further release of fluid under pressure from piston chamber 2 will then occur and the piston 1 will be returned toward its normal position actuating the follow-up member 62 to move plunger 22 in the direction of plunger 21 as above described. However, with the plunger 21 in the position defined by contact between nut 35 and stop 72, the end of the piston rod 6 will engage stop 8 with plunger 22 still out of engagement with the release valve 45, so that a complete release of fluid under pressure from piston chamber 2 will occur.

It will now be seen that by decreasing the pressure of fluid in chamber 12, the structure will operate to cause the piston 1 and device being operated to assume a position corresponding to such decrease, or a plurality of different selected positions successively upon a series of chosen reductions in the pressure of fluid in chamber 12. Moreover it will also be seen from the above description that the operator by providing suitable pressures of fluid in chamber 12 may cause the power piston 1 to move first in one direction and then in the opposite direction to obtain any chosen adjustment, or series of different adjustments, or change in adjustment of the device being operated.

It will be noted that whatever pressure of fluid is effective in chamber 2 on the power piston 1 is likewise effective in chamber 24 in plunger 21. This pressure of fluid on plunger 21 opposes pressure of fluid in chamber 13 on diaphragm 12 and thus tends to change the position of plunger 21 as chosen by the pressure of fluid provided in said chamber by the operator. This tendency is however counteracted at all times by subjecting plunger 73 in chamber 76 to the same pressure of fluid as acting in chamber 24 on plunger 21 so that regardless of the pressure of fluid provided to actuate the power piston 1 the position of plunger 21 will always correspond to the pressure of fluid provided in chamber 12, and in turn, the position of the power piston 1 will likewise correspond to such pressure of fluid.

This structure and function just described is of particular importance where a device being operated requires different degrees of actuating force in different positions of the device and hence in different positions of the power piston. For instance, if only a relatively small actuating force were required to move the device to a certain position a relatively low pressure of fluid in chamber 2 might accomplish such movement and the effect of such low pressure acting in chamber 24 on plunger 21 against the pressure of controlling fluid in chamber 12 on diaphragm 13 might not cause any material change in the adjustment of plunger 21 and hence in the accuracy of adjustment of piston 1 in accordance with the pressure of fluid provided in chamber 12. However, if a much greater force were required to move the device to the certain position above mentioned, the correspondingly greater pressure of fluid required on piston 1 might not be obtained with the chosen controlling pressure in chamber 12, since the increased pressure in chamber 24 might be sufficient to move plunger 21 against the opposing pressure of fluid in chamber 12 and permit closing of the supply valve 40 before obtaining said greater pressure. To obtain the greater pressure the operator would then have to increase the pressure in chamber 12 to compensate for said greater pressure and thus above the degree normally required to obtain the desired positioning of the device. The structure shown in the drawing and above described avoids such difficulties however and ensures that the piston 1 will assume a position corresponding to the pressure of fluid provided in chamber 12, regardless of the pressure of fluid required in chamber 2 to move the piston 1 to the chosen position.

Having now described our invention, what we claim as new and desire to secure by Letters Patent, is:

1. A fluid pressure control device comprising spring means, movable control means subject to pressure of said spring means and to opposing pressure of fluid in a chamber, means providing for varying the pressure of fluid in said chamber, a plunger connected with and movable by said control means and having a supply chamber supplied with fluid under pressure, a supply valve carried by said plunger and operable to supply fluid under pressure from said supply chamber to a control chamber, seating means operable to effect closure of said valve, and means subject to pressure of fluid in said control chamber operable upon movement of said plunger by an increase in pressure of fluid in the first named chamber to open said supply valve and operable by pressure of fluid provided in said control chamber to render said seating means operable to effect closure of said supply valve.

2. A fluid pressure control device comprising spring means, movable control means subject to pressure of said spring means and to opposing pressure of fluid in a chamber, means providing for varying the pressure of fluid in said chamber, a plunger connected with and movable by said control means and having a supply chamber supplied with fluid under pressure, a supply valve carried by said plunger and operable to supply fluid under pressure from said supply chamber to a control chamber, seating means operable to effect closure of said valve, said plunger projecting from one side of said control means and being subject to pressure of fluid in said control chamber, a second plunger projecting from the opposite side of and connected with and movable by said control means and subject to pressure of fluid in said control chamber counteracting pressure of fluid in said control chamber acting on the first named plunger, and means subject to pressure of fluid in said control chamber operable upon movement of said plunger by an increase in pressure of fluid in the first named chamber to open said supply valve and operable by pressure of fluid provided in said control chamber to render said seating means operable to effect closure of said supply valve.

3. A fluid pressure control device comprising spring means, movable control means subject to and adjustable in accordance with the differential between pressure of fluid in a chamber and opposing atmospheric pressure plus pressure of said spring means, means providing for variations in pressure of fluid in said chamber, a plunger movable by said movable control means and having a fluid pressure supply chamber, means arranged to supply fluid under pressure to said supply chamber, a supply valve controlling a fluid pressure supply communication between said supply chamber and a control chamber, seating means operable to actuate said valve to close said communication, and means subject to pressure of fluid in said control chamber operable upon movement of said plunger by said control means upon an increase in pressure of fluid in the first named chamber to actuate said supply valve to open said communication and operable by pressure of fluid provided in said control chamber to render said seating means operable to actuate said supply valve to close said communication.

4. A fluid pressure control device comprising a casing having two spaced apart, parallel arranged bores, a power piston disposed in one of said bores and subject on one face to pressure of fluid in a power chamber, a spring in said casing acting on said piston in opposition to pressure of fluid in said chamber and cooperative with said pressure to position said piston in accordance with the degree of such pressure, the other bore being open at opposite ends to atmosphere, two relatively movable plungers slidably mounted in said other bore and cooperating to form a second chamber between their adjacent ends, conduit means connecting said power chamber and said second chamber, one of said plungers having a supply chamber supplied with fluid under pressure, a supply valve disposed in said supply chamber and arranged to control flow of fluid under pressure from said supply chamber to said second chamber and power chamber, a release valve in said second chamber cooperative with said second plunger to control a release communication for releasing fluid under pressure from said second chamber and power chamber, said one plunger being operable upon movement relative to and in the direction of said second plunger to effect closure of said release valve and opening of said supply valve and being operable upon movement in the opposite direction relative to said second plunger to effect opening of said release valve, and said second plunger being operable upon movement relative to said one plunger in a direction away from said one plunger to effect closure of said supply valve and in the opposite direction to effect closure of said release valve, lever means connecting said piston to said second plunger and having a fulcrum connection with said casing and operable upon movement of said power piston in response to an increase in pressure of fluid in said power chamber to render said second plunger movable in a direction away from said first plunger and in response to a reduction in pressure of fluid in said power chamber to move said second plunger in the direction of said first plunger, movable diaphragm means disposed in said casing in coaxial relation with and connected to the other end of said one plunger; said diaphragm means being subject to opposing pressures of atmosphere and of fluid in a control chamber, a regulating spring also acting on said diaphragm means in opposition to pressure of fluid in said control chamber, said diaphragm means being operable to move said first plunger in either one direction or in the opposite direction to a position corresponding to the pressure of fluid in said control chamber, and means connected to said control chamber providing for varying the pressure of fluid therein.

5. A fluid pressure control device comprising a casing having two spaced apart, parallel arranged bores, a power piston disposed in one of said bores and subject on one face to pressure of fluid in a power chamber, a spring in said casing acting on said piston in opposition to pressure of fluid in said chamber and cooperative with said pressure to position said piston in accordance with the degree of such pressure, the other bore being open at opposite ends to atmosphere, two relatively movable plungers slidably mounted in said other bore and cooperating to form a second chamber between their adjacent ends, conduit means connecting said power chamber and said second chamber, one of said plungers having a supply chamber supplied with fluid under pressure, a supply valve disposed in said supply chamber and arranged to control flow of fluid under pressure from said supply chamber to said second chamber and power chamber, a release valve in said second chamber cooperative with said second plunger to control a release communication for releasing fluid under pressure from said second chamber and power chamber, said one plunger being operable upon movement relative to and in the direction of said second plunger to effect closure of said release valve and opening of said supply valve and being operable upon movement in the opposite direction relative to said second plunger to effect opening of said release valve, and said second plunger being operable upon movement relative to said one plunger in a direction away from said one plunger to effect closure of said supply valve and in the opposite direction to effect closure of said release valve, lever means connecting said piston to said second plunger and having a fulcrum connection with said casing and operable upon movement of said power piston in response to an increase in pressure of fluid in said power chamber to render said second plunger movable in a direction away from said first plunger and in response to a reduction in pressure of fluid in said power chamber to move said second plunger in the direction of said first plunger, movable diaphragm means disposed in said casing in coaxial relation with and connected to the other end of said one plunger, said diaphragm means being subject to opposing pressures of atmosphere and of fluid in a control chamber, a regulating spring also acting on said diaphragm means in opposition to pressure of fluid in said control chamber, said diaphragm means being operable to move said first plunger in either one direction or in the opposite direction to a position corresponding to the pressure of fluid in said control chamber, and means connected to said control chamber providing for varying the pressure of fluid therein, said diaphragm means comprising two spaced apart flexible diaphragms cooperating to form a chamber between them, conduit means connecting the last named chamber to said supply chamber, and a fluid pressure supply pipe connected to the chamber between the two diaphragms for supplying fluid under pressure thereto and to said supply chamber.

6. A fluid pressure control device comprising a casing having two spaced apart, parallel arranged bores, a power piston disposed in one of said bores and subject on one face to pressure of fluid in a power chamber, a spring in said casing acting on said piston in opposition to pressure of fluid in said chamber and cooperative with said pressure to position said piston in accordance with the degree of such pressure, the other bore being open at opposite ends to atmosphere, two relatively movable plungers slidably mounted in said other bore and cooperating to form a second chamber between their adjacent ends, conduit means connecting said power chamber and said second chamber, one of said plungers having a supply chamber supplied with fluid under pressure, a supply valve disposed in said supply chamber and arranged to control flow of fluid under pressure from said supply chamber to said second chamber and power chamber, a release valve in said second chamber cooperative with said second plunger to control a release communication for releasing fluid under pressure from said second chamber and power chamber, said one plunger being operable upon movement relative to and in the direction of said second plunger to effect closure of said release valve and opening of said supply valve and being operable upon movement in the opposite direction relative to said second plunger to effect opening of said release valve, and said second plunger being operable upon movement relative to said one plunger in a direction away from said one plunger to effect closure of said supply valve and in the opposite direction to effect closure of said release valve, lever means connecting said piston to said second plunger and having a fulcrum connection with said casing and operable upon movement of said power piston in response to an increase in pressure of fluid in said power chamber to render said second plunger movable in a direction away from said first plunger and in response to a reduction in pressure of fluid in said power chamber to move said second plunger in the direction of said first plunger, movable diaphragm means disposed in said casing in coaxial relation with and connected to the other end of said one plunger, said diaphragm means being subject to opposing pressures of atmosphere and of fluid in a control chamber, a regulating spring also acting on said diaphragm means in opposition to pressure of fluid in said control chamber, said diaphragm means being operable to move said first plunger in either one direction or in the opposite direction to a position corresponding to the pressure of fluid in said control chamber, another plunger slidably mounted in said casing in coaxial relation and connected to said one plunger and subject to pressure of fluid in a chamber which opposes pressure of fluid in said second chamber acting on said one plunger, conduit means establishing a fluid flow communication between the two last named chambers, and means connected to said control chamber providing for varying the pressure of fluid therein.

HARRY C. MAY.
GLENN T. McCLURE.